United States Patent

[11] 3,547,252

| [72] | Inventors | Ford J. Brown<br>Kutztown;<br>Ralph L. Mueller, Emmaus, Pa. |
|---|---|---|
| [21] | Appl. No. | 733,088 |
| [22] | Filed | May 29, 1968 |
| [45] | Patented | Dec. 15, 1970 |
| [73] | Assignee | Western Electric Company, Incorporated<br>New York, N.Y.<br>a corporation of New York |

[54] VIBRATORY QUARTZ TUBE ASSEMBLY FOR ADVANCING ARTICLES
14 Claims, 9 Drawing Figs.

[52] U.S. Cl. .................................................. 198/218,
198/220; 209/325
[51] Int. Cl. ..................................................... B65g 25/04
[50] Field of Search ......................................... 198/218,
220, C10, 220, D20; 209/325, 326, 365

[56] References Cited
UNITED STATES PATENTS

| 2,232,124 | 2/1941 | Markley .................... | 198/220 |
| 3,176,834 | 4/1965 | Allen et al. ................. | 198/200 |
| 3,236,381 | 2/1966 | Poynter ...................... | 209/325 |

*Primary Examiner*—Andres H. Nielsen
*Attorneys*—H. J. Winegar, R. P. Miller and J. L. Landis ABSTRACT: A batch of articles are loaded in a container which passes through a sintering furnace and which is vibrated by a pair of motor driven, mechanical oscillation generating devices. A first of the oscillation generating devices imparts rectilinear horizontal vibrations to the articles, while the second device modifies the output of the first device to impart force components that tend to lift and thrust the articles. By controlling the second device, the force components imparted to the articles can be controlled to (1) advance the articles toward the right or left, or (2) maintain the articles vibrating about a fixed point.

INVENTORS
FORD J. BROWN
RALPH L. MUELLER

BY R. P. Miller
ATTORNEY

VIBRATORY QUARTZ TUBE ASSEMBLY FOR ADVANCING ARTICLES

BACKGROUND OF THE INVENTION

This invention relates to a method of and apparatus for vibrating articles and more particularly, to a method of and apparatus for utilizing vibrations for selectively advancing articles in a predetermined direction and for agitating the articles about a fixed point on a supporting surface.

The invention, although not limited thereto, finds special utility in the vibratory feeding of discrete articles through a work zone or treating chamber, such as a furnace. For example, the invention is particularly useful for moving dry reed switch contact reeds, which comprise a base metal alloy of iron-nickel coated with a copper-gold plate, through a sintering furnace, wherein the reeds are subjected to a high temperature to sinter plate onto the base metal to improve the electrical characteristics of the switches in which the reeds are employed.

In the past, a number of techniques for vibratory feeding discrete articles, such as dry reeds, were developed. Generally speaking, these techniques offered a reasonably acceptable means for advancing articles along the guideway or through a work zone, but they were often inherently limited to the continuous advancement of the articles in a single direction. This seriously limited the utility of these advancing techniques in processes where it was necessary to incrementally and intermittently advance articles, or where it was necessary to intermittently and alternatively advance articles, and then agitate them. For example, this limitation proved particularly disadvantageous when the articles being fed were to be intermittently stopped in a treating chamber, such as a furnace, wherein the imminent treatment might adversely effect the stationary or stagnant articles. Thus, prior art vibratory advancing techniques have proven inadequate for feeding switch contact reeds into a sintering furnace because insufficient agitation of the reeds resulted in an undesirably high number of the reeds becoming bonded to each other. This serious disadvantage was not limited to the treatment of contact reeds, and similar problems were encountered in other processes as well.

Accordingly, it is desirable to afford a means for (1 advancing discrete articles, such as contact reeds, into a work zone or treating chamber, such as a furnace, (2) agitating the articles about a fixed point within the work zone to ensure uniform exposure to the treating atmosphere and to preclude the undesirable affects of article stagnation, such as article-to-article bonding and (3) removing the articles from the work zone after the desired treatment has been completed.

SUMMARY OF THE INVENTION

One solution to the problem is provided by the instant invention which, for the sake of brevity, is described herein only in connection with the advancement of contact switch reeds into a sintering furnace, agitation of the reeds within the furnace, and removal of the reeds from the furnace after the sintering operation is completed.

In accordance with the present invention a plurality of reeds are placed upon a supporting surface which extends into a furnace, and which is movably mounted on a base, so that oscillatory or vibratory forces may be imparted thereto. The oscillatory forces required to advance and agitate the reeds are provided by a pair of oscillating devices, one of which is fixedly mounted on the base, while the other is mounted on the base for movement relative to both the base and the fixedly mounted device. The movably mounted oscillating device may be connected to the reed supporting surface in any suitable manner, such as by a pivotably connected linkage, which enables the movably mounted oscillator to impart substantially rectilinear horizontal oscillations to the surface and thus, to the reeds. The fixedly mounted oscillating device may be connected to the movable oscillator by a pivotal drive rod coupling connected between the mounting means of the movable oscillator and the oscillation generating portion of the fixedly mounted oscillator. Connection of the two oscillators in this manner, or by any equivalent thereof, enables the fixedly mounted oscillator to superimpose its oscillations on those of the movably mounted oscillator, so that the superimposed oscillations impart additional force components to the supporting surface which tend to lift the reeds; the net effect of the combined superimposed oscillations being to lift and thrust the reeds in a rearward or forward direction. By selectively controlling the oscillators the force components imparted to the reeds can be controlled to (1) advance the reeds along the reed supporting surface and into the furnace in anticipation of the sintering operation, (2) advance the reeds out of the furnace after sintering or (3) agitate the reeds about a substantially fixed point on the reed supporting surface, either before, during or after the sintering operation.

BRIEF DESCRIPTION OF THE DRAWING

The invention will be more fully understood by reference to the following detailed description of a specific embodiment thereof taken in conjunction with the drawing wherein.

DETAILED DESCRIPTION

Figure 1:
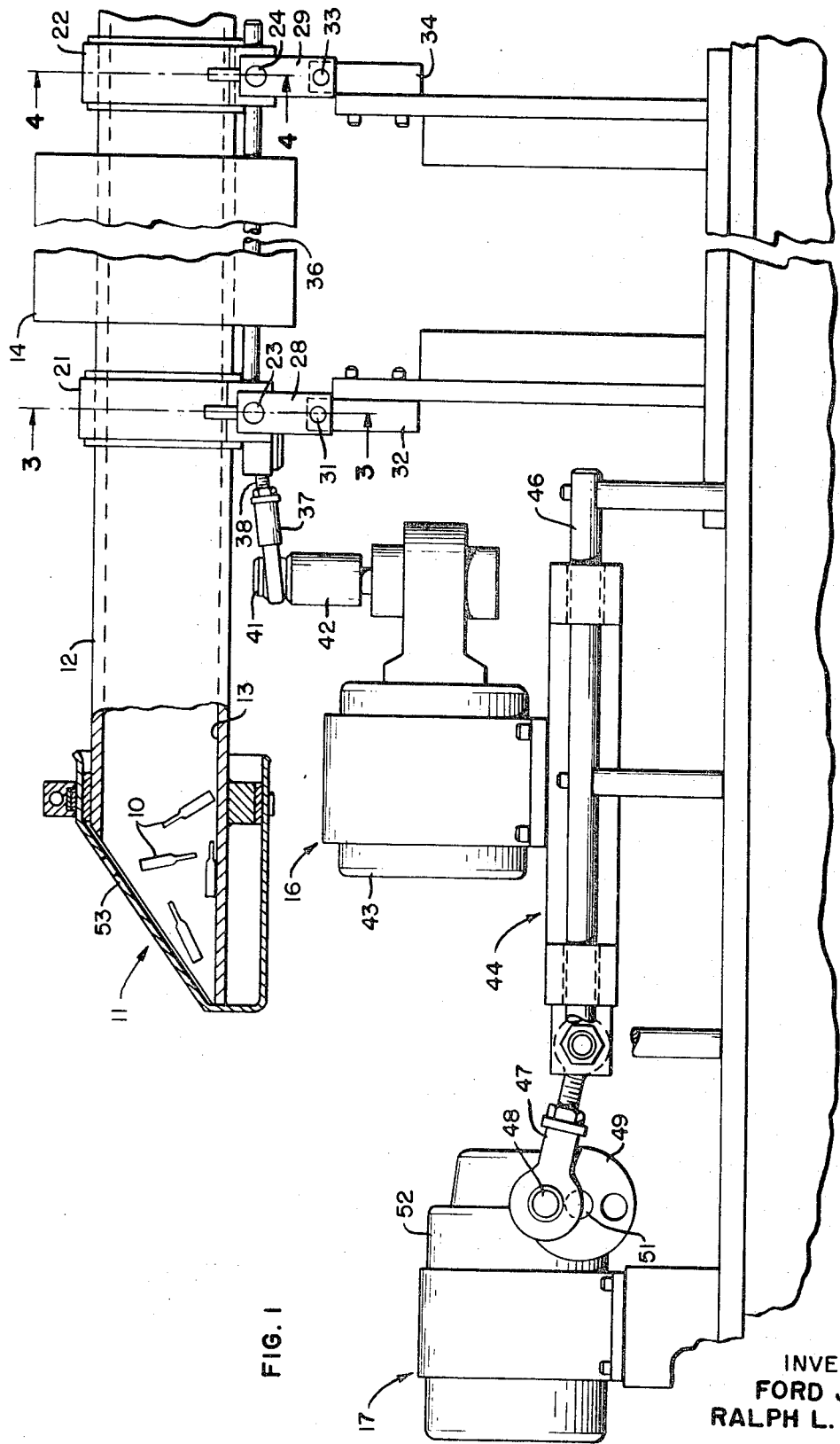
FIG. 1 is a front elevational view, with portions removed and broken away for the sake of clarity, of a shaker and furnace assembly, embodying the principles of the invention and illustrating the manner in which a fixedly mounted oscillating device is connected to a movably mounted oscillating device for selectively controlling oscillations to a reed supporting tube to impart vibratory forces thereon which control the vibratory motion of the reeds in the furnace.
Figure 2:
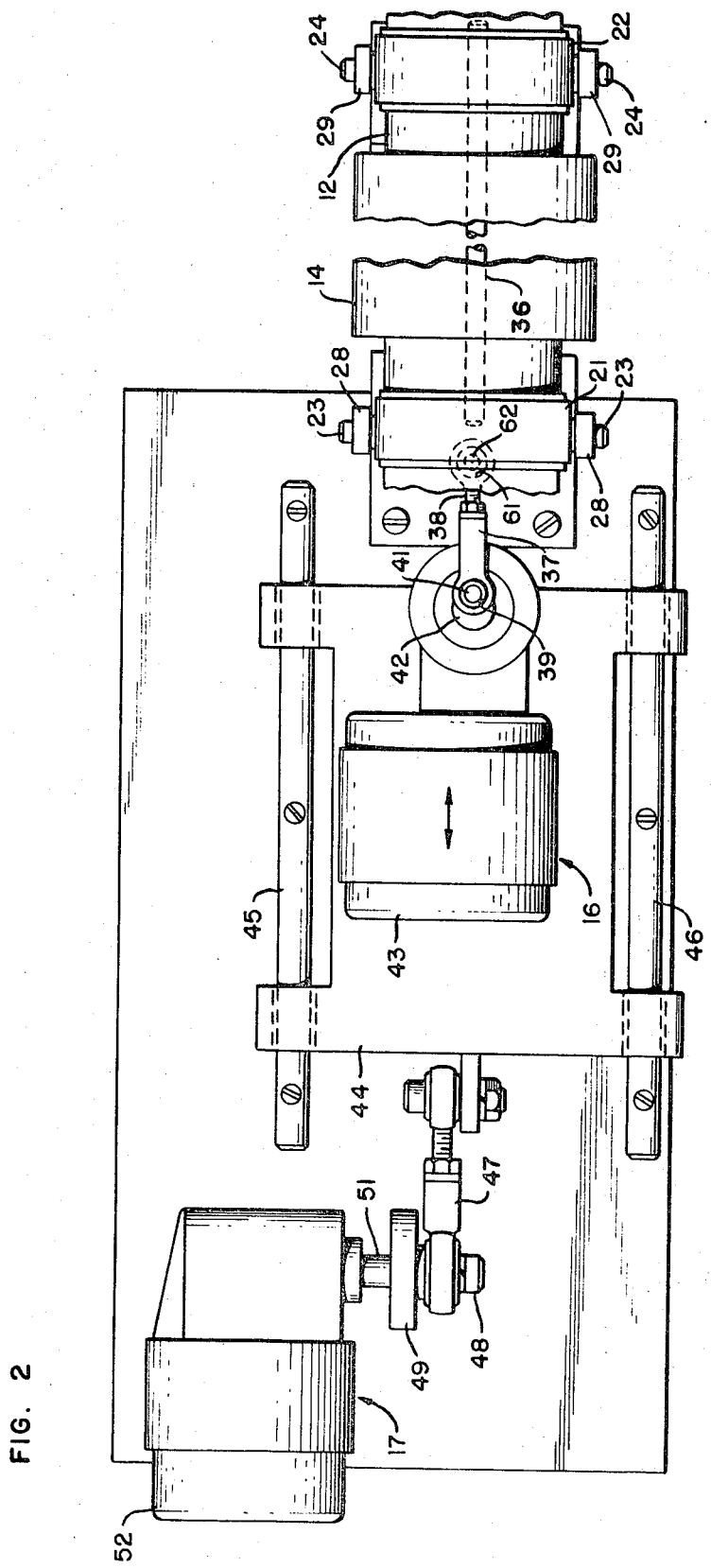
FIG. 2 is a top elevational view, with portions removed and broken away for the sake of clarity, of the shaker assembly shown in FIG. 1.

Referring first to FIGS. 1 and 2 of the drawing, there is shown an assembly for advancing and agitating articles, such as a batch of switch contact reeds 10. The reeds 10 are loaded into the entrance end 11 of a reed receiving member, which, for the purposes of illustration, is depicted as an elongated quartz tube 12 which passes through a conventional sintering furnace 14. The tube 12 is vibrated by a pair of motor driven, mechanical oscillating devices 16 and 17. The oscillating device 16 imparts rectilinear, horizontal oscillations to the tube 12, and thus, to the reeds 10, while the oscillating device 17 modulates the output of device 16 to impart force components to the tube 12 which tend to lift and thrust the reeds either toward or away from the entrance end 11 of the tube 12. By controlling the output of the device 17, to selectively position or superimpose vibrations on the oscillating device 16, the force components imparted to the reeds 10 can be controlled to advance the reeds toward the furnace 14, to advance the reeds towards the entrance end 11 an of the tube 12, or to maintain the reeds vibrating about a fixed point on the tube bottom 13.

Figure 3:
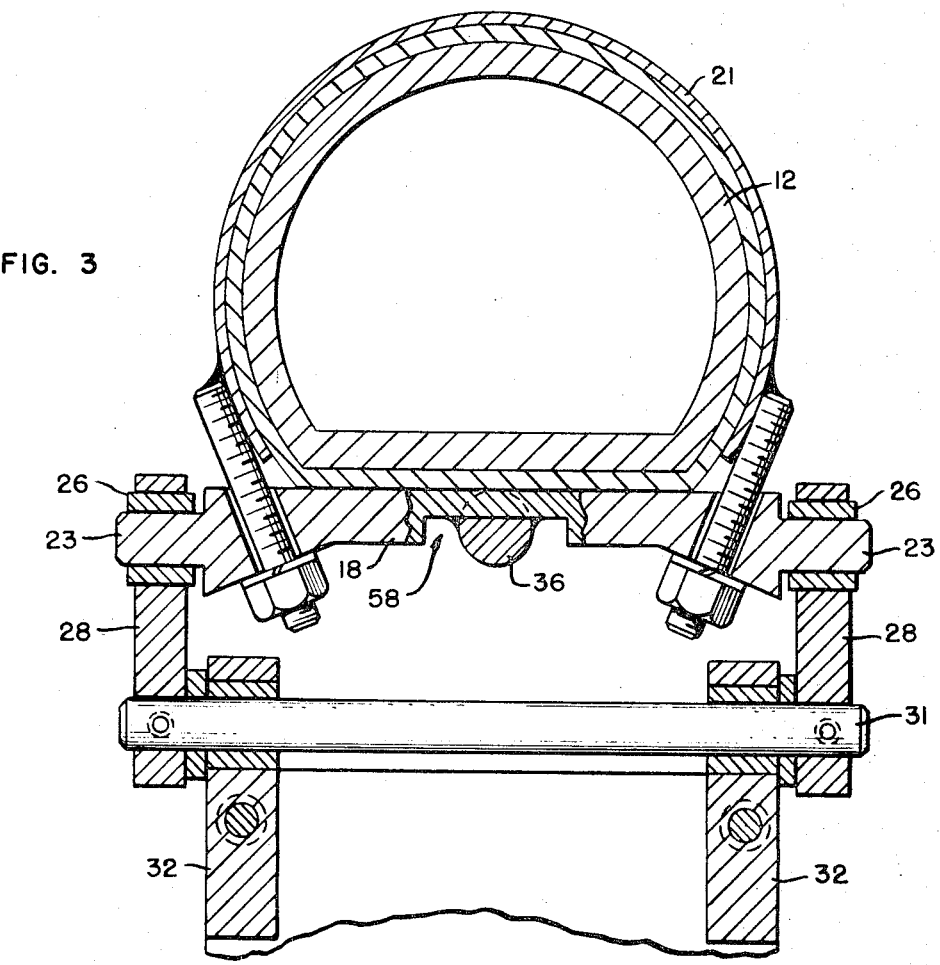
FIG. 3 is a sectional view, taken along lines 3–3 of FIG. 1, depicting the D-shaped configuration of the reed containing tube which passes through the furnace, and the manner in which the tube is pivotably connected to a bracket on the shaker base.
Figure 4:
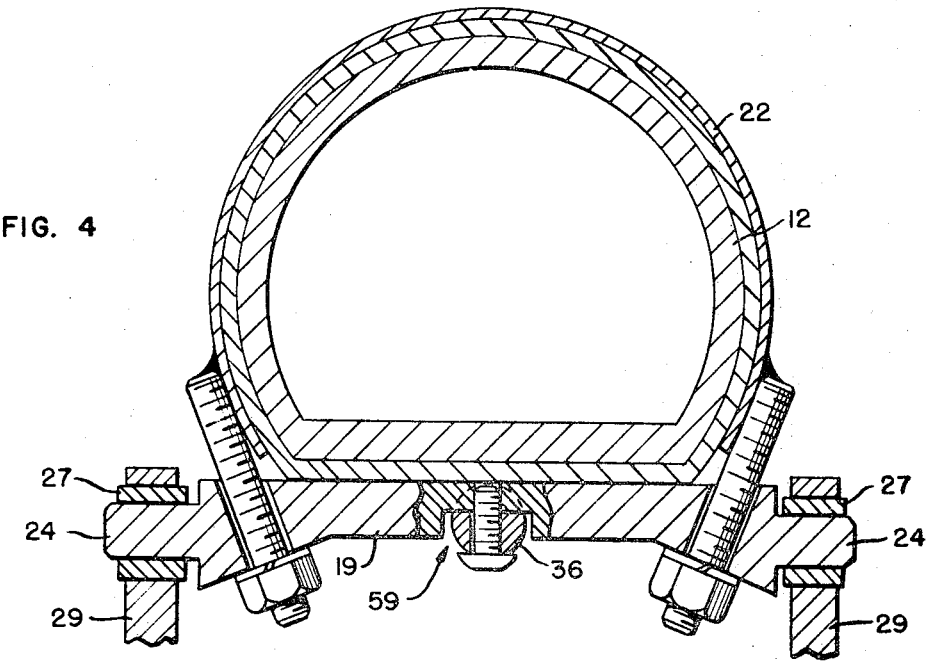
FIG. 4 is a sectional view, taken along lines 4–4 of FIG. 1, again depicting the D-shaped configuration of the tube.

As shown in FIGS. 3 and 4 of the drawing, a tube 12 has a D-shaped configuration and is mounted on a pair of cross braces 18 and 19 by bolted straps 21 and 22. The ends of the braces 18 and 19 are shaped to provide a pair of pintles 23 and 24, respectively, projecting into graphite bearings 26 and 27 secured in pairs of links 28 and 29. The links 28 are pinned to a shaft 31 passing through bearings mounted in a bracket 32. The links 29 are pinned to a shaft 33 (see FIG. 1) which extends through bearings mounted in bracket 34. A connecting rod 36 is mounted between the cross braces 18 and 19 by soldering or welding one end of the rod 36 in a recess 58 in the brace 18, and by bolting the other end of the rod in a recess 59 in brace 19, so that movement of one set of links 28 is imparted to the other set 29. In order to impart oscillation from the devices 16 and 17, there is provided an adjustable rod coupling 37 connected to a stud shaft 38 extending from the underside of the brace 18. As shown in FIG. 2, the shaft 38 is provided with an eye 61 at one end thereof, which is pivotably mounted on a pin 62 extending from the underside of the brace 18. The left-hand end of the rod coupling 37 is provided with an eye 39 into which is fitted a pin 41 projecting in an eccentric manner from a drive shaft 42 driven by a motor 43 of the device 16. The motor 43 may be adjusted to rotate at speeds up to 500 r.p.m. With the motor 43 running, the rotation of the shaft 42 and the eccentric pin 41 imparts an oscillatory motion to the drive rod coupling 37 and the connecting rod 36 to oscillate the two sets of links 28 and 29 about the pivot shafts 31 and 33. The entire tube 12 is thus oscillated back and forth to shake the reeds 10.

In order to impart forces in the components which tend to advance or retract the reeds 10, there is provided a second oscillating device 17. It will be noted from FIGS. 1 and 2 that the first oscillating device 16 is mounted on a platform 44 which is slidably mounted on a pair of guide rods 45 and 46. The platform 44 is reciprocated back and forth by a drive rod coupling 47 connected at one end to the platform and at its other end to a pin 48 eccentrically mounted on a disc 49. Disc 49 is connected to a shaft 51 driven by a motor 52 of the oscillating device 17. The motor 52 is also a variable speed motor which may be adjusted to rotate at speeds up to 16 r.p.m.

Figure 5:
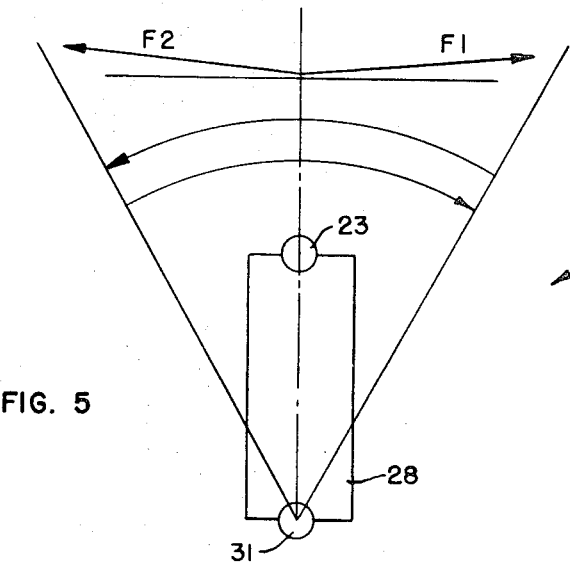
FIGS. 5—7 are schematic views depicting the effective force vectors imparted to the reed containing tube when a pivotable oscillation translating link oscillates in equal arcs about a vertical plane extending through a pivot shaft (FIG. 1), when the link oscillates in equal arcs about a plane disposed at a first acute angle relative to said vertical plane (FIG. 6), and when the link oscillates in equal arcs about a plane disposed at a second acute angle relative to said vertical plane (FIG. 7), respectively.

When the motor 52 is not running, and the eccentric pin 48 is in the position shown in FIG. 1, the device 16 is positioned so that the motor 43 drives the eccentric pin 41 to oscillate the links 28 in equal arcs about a vertical plane extending through the pivot shaft 31. In addition, since connecting rod 36 translates the movement of links 28 to links 29, links 29 oscillate in equal arcs about a vertical plane extending through the pivot shaft 33. Since links 28 and 29 oscillate in equal arcs about a vertical plane, there are no force components tending to move the reeds 10 along the length of the tube 12, but rather the forces merely thrust the reeds back and forth within the tube. The resultant force component under these circumstances, is illustrated in FIG. 5 wherein effective force vectors F1 and F1 are equal in magnitude and have major components which act in substantially opposite directions in a horizontal plane. Thus, even though there are small components acting to lift the reeds, the net result is that the reeds move back and forth on the bottom 13 of the tube 12.

Considering now the situation where the disc 49 is rotated to move the eccentric pin 48 in a left-hand position so that the platform 44 shifts to the left. With the motor 43 deenergized, it may be appreciated that the movement of the motor 43 and its connecting mechanism also moves the links 28 and 29 toward the left, into the position shown in FIG. 6. Under these circumstances, the subsequent energization of the motor 43 rotates the shaft 42 and the eccentric pin 41 to oscillate the links 28 and 29 in equal arcs about planes passing through the axes of shafts 31 and 33 at an angle represented by the letter A. There are now resultant forces F3 and F4 imparted to the reeds 10. The force F3 has a force component F3-1 which tends to lift the reeds 10 from the bottom 13 of the tube 12, and a force component F3-2 which tends to thrust the reeds toward the right. Considering now the force vector F4, it too has components, one of which, F4-2, is directed vertically downward, thus, tending to thrust the reeds against the bottom of the tube. The force vector F4-1 tends to thrust the reeds toward the left; but when these force vectors, F4-2 and F4-1, are effective the reeds are in an elevated position having been lifted by the force vector F3-1 and hence, the bottom of the tube is merely moved from under the elevated reeds. So long as the eccentric pin 48 is in a left position, the reeds 10 will move from left to right through the tube 12. Attention is directed to FIG. 7 which represents a force diagram resulting from movement of the eccentric pin to its right-hand position. In this instance, the links 28 and 29 oscillate in equal arcs about planes passing through pivot shafts 31 and 33 at an angle B, measured from vertical planes passing through the shafts. A like vector analysis may be made with respect to FIG. 7, as was made with FIG. 6, to show that the effective movement of the reeds is toward the left.

Figure 6:
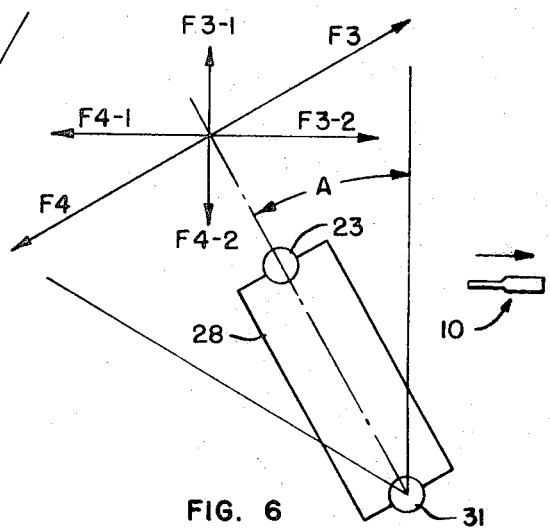
Figure 7:
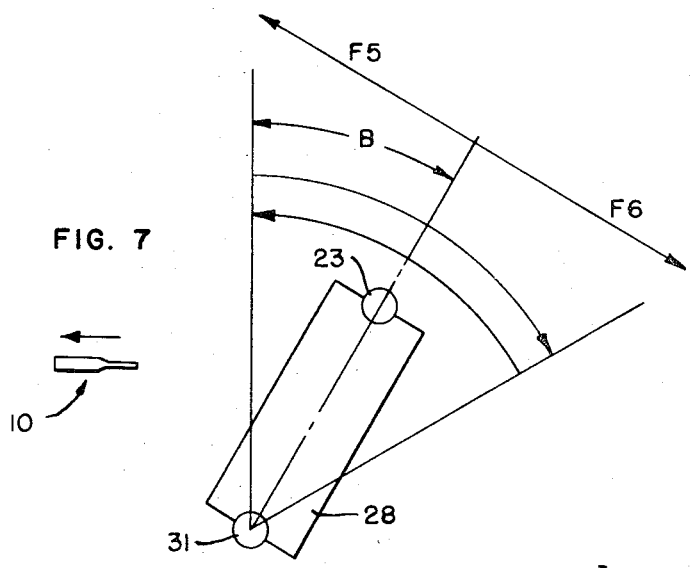
Figure 8:
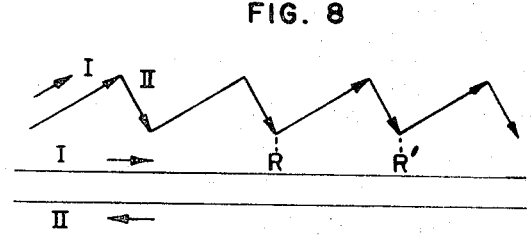
FIG. 8 is a schematic view illustrating the sawtooth path traversed by the reeds, in conjunction with the corresponding movement of the reed containing tube.

The movement imparted to the reeds may be further understood by considering the motion of the reeds as graphically illustrated in FIG. 8, wherein the sawtooth diagram illustrates the path taken by a reed 10 when the links 28 and 29 are oscillating about the plane designated by that passing through the link 28 in FIG. 6. First, as the tube oscillates to the right the reed 10 is thrust upward and toward the right from its initial position on the bottom 13 of the tube 12. Then, while the tube begins to return to the left, the reed reaches its maximum elevation above the tube bottom and begins to drop under the influence of gravity, whereupon the reed again engages the tube, but now in a position advanced to the right of the reed's initial position. The above-described sequence of events is depicted in FIG. 8, wherein the corresponding upward movement of the reed 10 and the movement of the tube 12 to the right are designated by the numeral I, and wherein the dropping of the reed and the return of the tube to the left are designated by the numeral II. In addition, the position of a reed 10 before and after a single I—II sequence is designated by the letters R and R', respectively.

Figure 9:
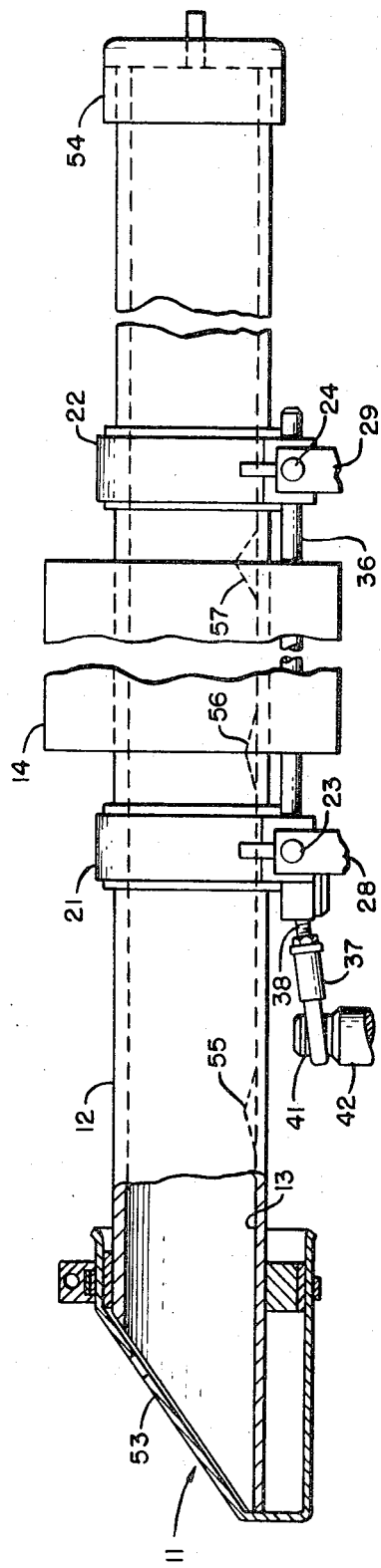
FIG. 9 is a front elevational view, with portions removed and broken away for the sake of clarity, of an alternative embodiment of the reed containing tube shown in FIG. 1.

In an alternative construction, as illustrated in FIG. 9, the tube 12 may be divided into four sections or zones by means of elongated triangular ramplike members 55, 56 and 57 and a slidable wall (not shown); the slidable wall, positioned between the entrance end 11 of the tube 12 and the first ramp 55, together with the entrance end 11 defining a feeding zone, the first ramp together with the slidable wall defining a cooling zone, the first and second ramps defining a transferring zone, and the second and the third ramps 56 and 57, each inside the furnace, defining a heating zone. The first and second ramps 55 and 56 have substantially the same configuration and have gently sloping surfaces which offer only a slight resistance to passage by an advancing reed 10; while the third ramp 57 has a more steeply inclined surface and projects a greater distance above the tube bottom 13 than to the ramps 55 and 56 to enable the ramp 57 to prevent the advancing reed from moving to the right thereof. The slidable wall, when positioned between the entrance end 11 and the ramp 55 prevents the reeds from advancing too far towards the entrance and during the cooling operation. When employing the alternative tube construction the mode of operation is essentially the same as when a wholly flat tube bottom is employed, the principal difference being in manner in which the reeds 10 are removed from the tube.

OVERALL OPERATION

In the utilization of the apparatus the tube 12 is placed in a sintering furnace 14 and a cap 53 is removed to allow an attending operator to load a batch of reeds 10 into the left-hand or entrance end 11 of the tube. The motor 52 is energized to move the pin 48 to the left-hand position and then stopped. The motor 43 is then started, and the oscillations imparted to the links 28 and 29 cause the reeds to move toward the right until the reeds move into the furnace 14, whereupon the motor 52 is again energized. With both motors 43 and 52 running the links 28 and 29 again oscillate in extended arcs about vertical planes passing through the shafts 31 and 33. This results in a very complex mixture of forces which thoroughly agitate the reeds 10 within the furnace 14 to prevent them from fusing together while being subjected to the relatively high sintering temperatures. Upon completion of the sintering operation the motor 52 is shut off again to stop the eccentric pin in the left-hand position. Upon continued operation of motor 43 the reeds 10 will advance toward the right-hand end of the tube 12. The sintered reeds may then be withdrawn by removing a cap 54 (FIG. 9) in the right-hand end of the tube. In the alternative, the reeds may be discharged by stopping the motor 52 to position the eccentric pin 48 in its right-hand position, whereupon subsequent operation of motor 43 causes the reeds to advance back down the tube to the entrance end 11 so that removal of cap 53 enables an operator to remove the reeds 10.

When the alternative tube construction is employed the reeds 10 are first fed in the entrance end 11 of the tube 12, whereupon the slidable wall (not shown) is positioned between the entrance end and the reeds. The motor 52 is energized to move the eccentric pin 48 to the left-hand position and then stop. The motor 43 is started and the oscillations imparted to the links 28 and 29 cause the reeds to move toward the right until the reeds move over the ramp 55 and over the ramp 56 into the furnace 14. The ramp 57 prevents the reeds from advancing too far to the right, and together with ramp 56, defines a reed heating zone. When the motor 52 is again energized the reeds are agitated within the heating zone to prevent them from fusing together. After the sintering operation is completed the motor 52 is shut off to stop the eccentric pin in the right-hand position, whereupon continued operation of motor 43 causes the reeds to advance to the left over the ramp 56, over the ramp 55, and against the slidable wall. The slidable wall prevents the reeds from advancing too far to the left and ensures that the reeds collect in the cooling zone between ramp 55 and the wall itself. At this point, both the motors 43 and 52 are energized to operate at a predetermined r.p.m. to agitate the reeds in the cooling zone until they are cool enough for removal from the tube. After the cooling operation the motor 52 is again stopped with the eccentric pin 48 in the right-hand position and the slidable wall is removed from the tube, whereupon continued operation of motor 43 causes the reeds to advance further to the left toward the entrance end 11 of the tube 12. After the reeds have collected in the entrance end, motor 43 is stopped, cap 53 is removed, and the reeds are removed from the tube.

It is to be understood that the above-described embodiments are simply illustrative of the principles of the invention. Thus, although the invention has been described in connection with a method of advancing and agitating a batch of contact reeds, it is to be understood that its use is not so limited that it may be employed for other applications as well. Moreover, various other modifications and changes may be devised by those skilled in the art which will embody the principles of the invention and fall within the spirit and scope thereof.

We claim:

1. In an article advancing apparatus:
a member having a surface for supporting articles to be advanced;
a first motor;
means driven by said first motor for imparting oscillatory forces to move said member between positions equiangularly spaced about a vertical line passing through said member to move the articles back and forth along said surface;
a second motor; and
means driven by said second motor for shifting said first motor and said oscillatory force imparting means to impart said oscillatory forces to said member about a line that is at an angle to said vertical line to advance said articles along said surface.

2. In an apparatus for imparting vibrations to articles:
an oscillating means;
a substantially horizontal article support connected to said oscillating means for movement in an equiangular arcuate path about a line drawn vertically through said support;
a motor; and
means driven by said motor for shifting said oscillating means to shift said arcuate path to an equiangular path about a line at an acute angle relative to said vertical line to impart forces to said support to advance the articles along said support.

3. In an apparatus for imparting vibrations to articles:
means for generating mechanical oscillations;
means mounting said oscillation generating means for horizontal reciprocating movement;
an article support;
means connected to said oscillation generating means and pivotably connected to said support for translating oscillations to move said support in a vertically bisected arcuate path;
a motor; and
means driven by said motor for moving said oscillation generating means to pivot said connecting means to translate oscillations which move said support in an arcuate path disposed at an acute angle relative to said vertically bisected arcuate path to impart forces to advance the articles along said support.

4. An apparatus as set forth in claim 3, which includes: means for simultaneously and continuously operating said oscillation generating means and said moving means to vibrate the articles back and forth on said surface.

5. In an apparatus for imparting vibrations to articles:
a base;
a support having a substantially horizontal surface for receiving articles;
a pair of links, each pivotably mounted at one end to said base and pivotably connected at the opposite end to said support; means for oscillating each of said links about a line drawn vertically through said base to move the articles back and forth on said support;
means mounting said oscillating means for reciprocating horizontal movement for pivoting said links to oscillate about lines that are angularly disposed relative to said vertical lines;
a motor; and
means driven by said motor for moving said mounting means to pivot said links and position said oscillating means to oscillate the links and impart forces to said support to advance the articles along said surface.

6. An apparatus as set forth in claim 5, which includes: means for simultaneously and continuously operating said oscillating means and said moving means to vibrate the articles back and forth on said surface.

7. An apparatus for vibrating articles, which comprises:
a base;
an article receiving container having an entrance end and a substantially flat bottom for supporting the articles;
means movably mounting said container to said base;
a platform reciprocably mounted on said base;
means mounted on said platform for generating mechanical oscillations;
means for communicating said oscillations to said container to impart forces which vibrate and move the articles back and forth along the length of said bottom;
two ramps disposed at spaced intervals across said bottom, each of said ramps having a triangular cross section; and
means for selectively reciprocating said platform or for holding said platform in a predetermined position to control the forces imparted to the articles to advance the articles over the ramp closest to said entrance end and against said ramp furtherest from said entrance end, and to vibrate the articles between said ramps.

8. In an apparatus for agitating and advancing articles;
an elongated tube for holding the articles, said tube having an entrance end and a substantially flat bottom for supporting the articles;
base means having a spaced pair of brackets extending therefrom;
a pair of pivotal mountings connected respectively to said brackets for supporting said tube;
straps for circumferentially holding said tube on said pivotal mountings;
means interconnecting said pivotal mountings for communicating movement therebetween;
means mounted on said base for applying movement to said pivotal mountings to impart forces on the articles;
two ramps disposed at spaced intervals across said tube bottom, said ramps having a triangular cross section, the ramp furtherest from said articles and having a steeper slope and higher summit; and
means for modulating the forces imparted to the articles to advance the articles over the ramp having lower summit and against said ramp furtherest from said entrance end, and to agitate the articles between said ramps.

9. In an apparatus as set forth in claim 8, wherein said means for applying movement to said pivotal mounting includes:
means for generating mechanical oscillations, said means including a motor, a drive shaft connected to said motor and a pin eccentrically extending from said shaft, said motor being fixedly mounted to said platform, said pin being movably connected to one of said pivotal mountings; and wherein said force modulating means includes:
a platform mounted for horizontal reciprocating movement on said base, and
means fixedly mounted to said base for selectively communicating reciprocating movement to said platform or for holding the platform in a predetermined position to control the movement communicated through said eccentric pin to said tube and to control the forces imparted to the articles.

10. An apparatus as set forth in claim 9, which further includes: means for heating a predetermined length of said tube, said predetermined length including said ramp furtherest from said entrance end of said tube.

11. In a method of advancing articles into a treating chamber:
supporting the articles on a surface;
oscillating the surface about a line that is at an acute angle with respect to the vertical, said angle being in the direction away from the treating chamber, to advance the articles into the treating chamber; and
superimposing oscillations on the first oscillations to oscillate the surface about a vertical line to impart composite oscillations to vibrate the articles back and forth within the chamber.

12. A method as set forth in claim 11, which includes the further step of withdrawing the articles from the treating chamber by: discontinuing the superimposed oscillations when the composite oscillations are occurring about a line that is at an acute angle with respect to the vertical line, said angle being in the direction toward the treating chamber, to withdraw the articles from the treating chamber.

13. A method as set forth in claim 11, which includes the further step of withdrawing the articles from the treating chamber by: discontinuing the superimposed oscillations when the composite oscillations are occurring about a line that is at an acute angle with respect to the vertical line, said angle being in a direction away from the treating chamber, to withdraw the articles from the treating chamber.

14. An article advancing apparatus, comprising:
a base;
a container for the article;
a plurality of cross braces for supporting said container;
a plurality of brackets connected to said base;
a number of shafts each mounted in one of said brackets;
a plurality of linkage means, each individually connected at first end to one of said cross braces and having the other end pivotally journaled to one of the shafts;
a rod connecting the cross braces for moving all said linkage means simultaneously;
a first motor;
means driven by said first motor for applying oscillatory forces to one of the cross braces to move said container about a first point to move the article back and forth along said container;
a second motor; and
means driven by said second motor for shifting said first motor and said oscillatory imparting means to impart oscillatory forces about a second point spaced from the first point to advance the article along said container.